| (12) | United States Patent | (10) Patent No.: | US 9,946,516 B2 |
|---|---|---|---|
| | Herlitz et al. | (45) Date of Patent: | Apr. 17, 2018 |

(54) APPLICATION WORKFLOW FRAMEWORK

(71) Applicant: Starbucks Corporation, Seattle, WA (US)

(72) Inventors: Jesse James Herlitz, Seattle, WA (US); Jeffrey Ryan Peters, Bothell, WA (US); Bryan John Clark, Seattle, WA (US); Dana Marie Kruse, Seattle, WA (US); David C. Loewenthal, Seattle, WA (US); Justin T. Morgan, Bellevue, WA (US)

(73) Assignee: STARBUCKS CORPORATION, Seattle, WA (US)

( * ) Notice: Subject to any disclaimer, the term of this patent is extended or adjusted under 35 U.S.C. 154(b) by 214 days.

(21) Appl. No.: 14/214,079

(22) Filed: Mar. 14, 2014

(65) Prior Publication Data

US 2015/0261391 A1    Sep. 17, 2015

(51) Int. Cl.
  *G06F 9/44*   (2006.01)
  *G06Q 10/06*  (2012.01)
  *G06Q 20/34*  (2012.01)

(52) U.S. Cl.
  CPC .............. *G06F 8/34* (2013.01); *G06F 8/38* (2013.01); *G06F 9/4443* (2013.01); *G06Q 10/06* (2013.01); *G06Q 20/351* (2013.01)

(58) Field of Classification Search
  CPC .... G06F 3/048–3/04897; G06F 17/243; G06F 8/34; G06F 8/38; G06F 9/4443–9/4448; G06Q 10/06
  See application file for complete search history.

(56) References Cited

U.S. PATENT DOCUMENTS

| 6,720,967 B1 | 4/2004 | Cox et al. |
| 6,917,961 B2 | 7/2005 | Melet et al. |
| 7,082,576 B2 | 7/2006 | Shahine et al. |
| 7,380,260 B1 | 5/2008 | Billmaier et al. |
| 7,441,196 B2 | 10/2008 | Gottfurcht et al. |
| 7,523,391 B1 | 4/2009 | Eizenhoefer |
| 7,680,683 B2 | 3/2010 | Hilerio et al. |

(Continued)

OTHER PUBLICATIONS

PCT Search Report/Written Opinion for PCT/US15/20373, dated Jun. 29, 2015, 12 pages.

(Continued)

*Primary Examiner* — Jennifer To
*Assistant Examiner* — Liang Li
(74) *Attorney, Agent, or Firm* — Knobbe, Martens, Olson & Bear LLP

(57) ABSTRACT

The present disclosure relates to utilizing an application workflow framework to manage workflow on an application executing on a computing device. An illustrative workflow routine can include multiple tasks than need to be completed in order to complete the workflow routine. Accordingly, a workflow framework has a workflow definition that that matches the specific workflow routine. Each of the specific tasks defined in the workflow routine can be represented by a number of interface elements within the application. At least some of the interface elements can have a number of states of execution defined by the workflow definition and having different content and display attributes. In one embodiment, the states of execution can include a pre-active state, an active state, and a post-active state.

24 Claims, 10 Drawing Sheets

(56) References Cited

U.S. PATENT DOCUMENTS

| | | |
|---|---|---|
| 7,805,324 B2 | 9/2010 | Green et al. |
| 7,810,078 B2 | 10/2010 | Soroker et al. |
| 7,882,490 B2 | 2/2011 | Kodosky et al. |
| 7,899,679 B2 | 3/2011 | MacKay et al. |
| 7,937,666 B2 | 5/2011 | Klems et al. |
| 8,028,239 B1 | 9/2011 | Al-Hilali et al. |
| 8,131,591 B2 | 3/2012 | Gorty et al. |
| 8,136,050 B2 | 3/2012 | Sacher et al. |
| 8,181,150 B2 | 5/2012 | Szpak et al. |
| 8,245,147 B2 | 8/2012 | Copland et al. |
| 8,332,748 B1 | 12/2012 | Karam |
| 8,402,480 B2 | 3/2013 | Rohwer |
| 8,413,110 B2 | 4/2013 | Leung |
| 8,429,668 B2 | 4/2013 | Kowalkiewicz et al. |
| 8,438,471 B2 | 5/2013 | Thorpe et al. |
| 8,527,904 B2 * | 9/2013 | Liu .................. G06F 3/0488 345/173 |
| 8,543,436 B2 | 9/2013 | Bhatnagar et al. |
| 8,543,903 B2 | 9/2013 | Malkin et al. |
| 8,572,209 B2 | 10/2013 | Healey et al. |
| 8,589,817 B2 | 11/2013 | Fukimoto et al. |
| 8,601,507 B2 | 12/2013 | Billmaier et al. |
| 8,615,706 B2 | 12/2013 | Smith et al. |
| 8,645,854 B2 | 2/2014 | Kopycinski et al. |
| 8,650,474 B2 | 2/2014 | Scoda |
| 8,656,352 B2 | 2/2014 | Szpak et al. |
| 8,671,036 B2 | 3/2014 | Nelson et al. |
| 2002/0144233 A1 | 10/2002 | Chong et al. |
| 2005/0229102 A1 | 10/2005 | Watson et al. |
| 2007/0245300 A1 | 10/2007 | Chan et al. |
| 2008/0276194 A1 * | 11/2008 | Dykstra-Erickson . G06F 17/243 715/780 |
| 2009/0007122 A1 * | 1/2009 | Peyton .................. G06F 8/34 718/102 |
| 2009/0287529 A1 | 11/2009 | Johnson |
| 2009/0322790 A1 | 12/2009 | Behar et al. |
| 2010/0064252 A1 * | 3/2010 | Kramer .............. G06F 3/0481 715/810 |
| 2010/0241990 A1 | 9/2010 | Gabriel et al. |
| 2011/0184870 A1 | 7/2011 | Angel et al. |
| 2012/0117470 A1 | 5/2012 | Michelstein et al. |
| 2013/0041707 A1 | 2/2013 | Bose et al. |
| 2013/0054299 A1 | 2/2013 | Deshpande et al. |
| 2013/0104021 A1 | 4/2013 | van den Broek et al. |
| 2013/0104067 A1 | 4/2013 | Sullivan et al. |
| 2013/0198750 A1 | 8/2013 | Charif et al. |
| 2013/0326342 A1 | 12/2013 | Tijssen et al. |
| 2014/0026024 A1 | 1/2014 | Kimber |
| 2014/0029743 A1 | 1/2014 | Blodgett et al. |
| 2014/0032606 A1 | 1/2014 | Chandler et al. |
| 2014/0380229 A1 * | 12/2014 | Volodin ............. G06F 3/04842 715/780 |
| 2015/0067504 A1 * | 3/2015 | Kim .................. G06F 3/0482 715/708 |
| 2015/0074588 A1 * | 3/2015 | Swinehart ......... G06F 3/04812 715/780 |
| 2015/0169699 A1 * | 6/2015 | Gilbert .............. G06F 3/0482 707/722 |
| 2015/0199123 A1 * | 7/2015 | Jitkoff ............... G06F 9/4443 715/786 |

OTHER PUBLICATIONS

Extended European Search Report for European Patent Application No. 15761924.8, dated Oct. 6, 2017, in 9 pages.

* cited by examiner

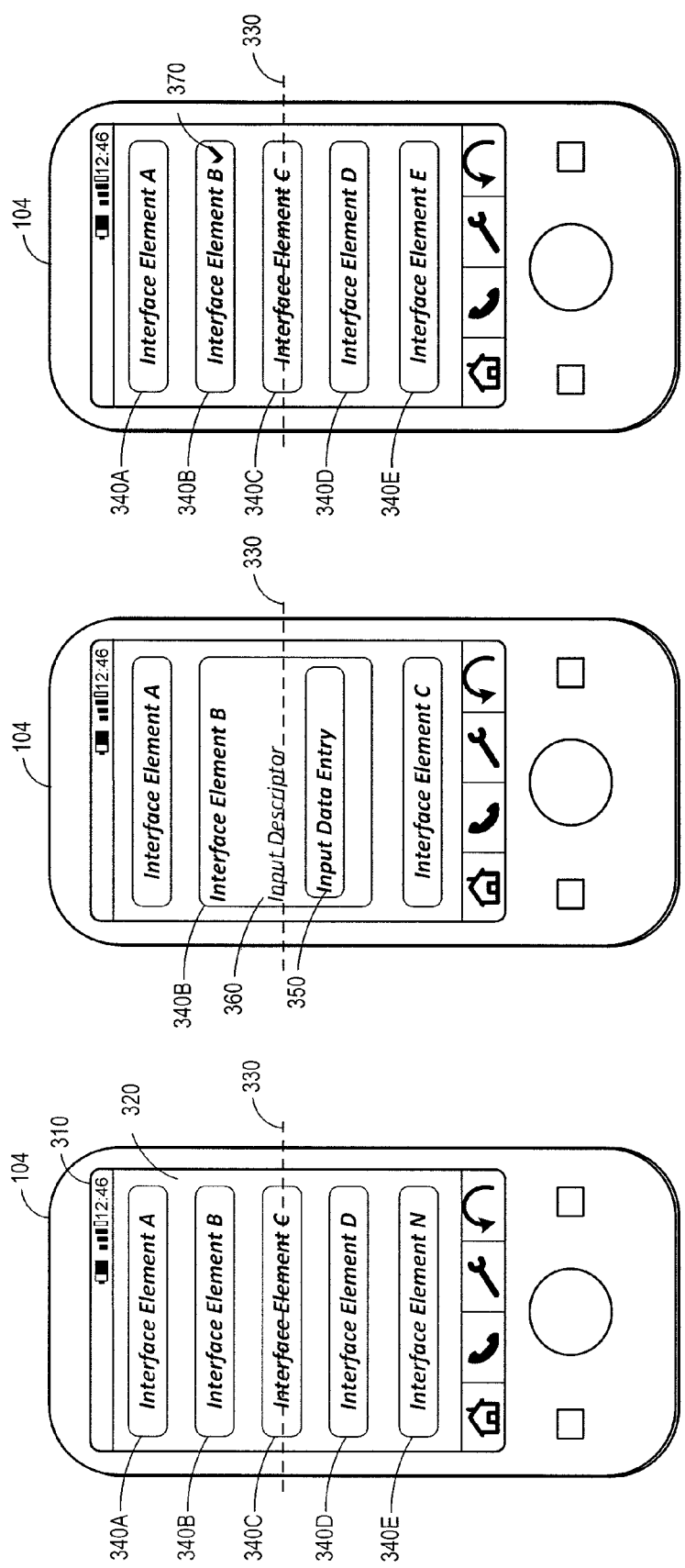

APPLICATION WORKFLOW FRAMEWORK

BACKGROUND

Generally described, computing devices can be used to access content and services over a communication network, such as the Internet. Traditionally, users can access content and services via a computing device, such as a desktop computing device, that may be associated with larger screen displays.

The continued development of and wireless communication networks and portable computing devices, such as mobile phones, has facilitated additional user interaction with content providers and service providers. Specifically, as mobile computing devices have become more prevalent, users are provided additional or alternative access to content and services. For example, there are a number of mobile devices that support the utilization of customized software applications, often referred to as "applications" or "apps" that are specifically configured for a particular purpose. For example, a mobile device provider or mobile device operating system provider may offer a library of customized applications, such as banking applications, merchandise ordering applications, and the like. Often, the presentation of an application or service via a customized software application can be characterized in terms of a workflow. For example, an application that facilitates shopping or ordering can be characterized by a workflow that includes selecting merchandise, finalizing ordering terms, entering personal or financial data, and confirming the purchase.

Because some portable devices, such as mobile phones, can have limited display areas, the amount of data or data elements that can be displayed at any particular time may be limited. For such limited display mobile devices, the implementation of the workflow will generally require the presentation of a sequence of pages that are required to implement the various workflow steps or stages. For example, a financial application may require the presentation of separate pages of content to facilitate the selection of financial terms, the inputting of identifiers and credentials, etc. In some instances, the workflow may be interrupted because the consumer can be confused or distracted by the presentation of information on various pages. In instances where a user needs to change or verify previous data entries or selections, it can be difficult to navigate back through the various pages to make the necessary change. Additionally, after the change has been completed, the software application may require the user to re-enter information that was already provided at subsequent steps in the workflow process. This can lead to dissatisfaction with the implementation or interruption of the workflow, resulting in a consumer terminating the workflow prematurely.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 3A-3C illustrate an embodiment of a client computing device that is configured to implement an application workflow framework.

DETAILED DESCRIPTION

Figure 1:
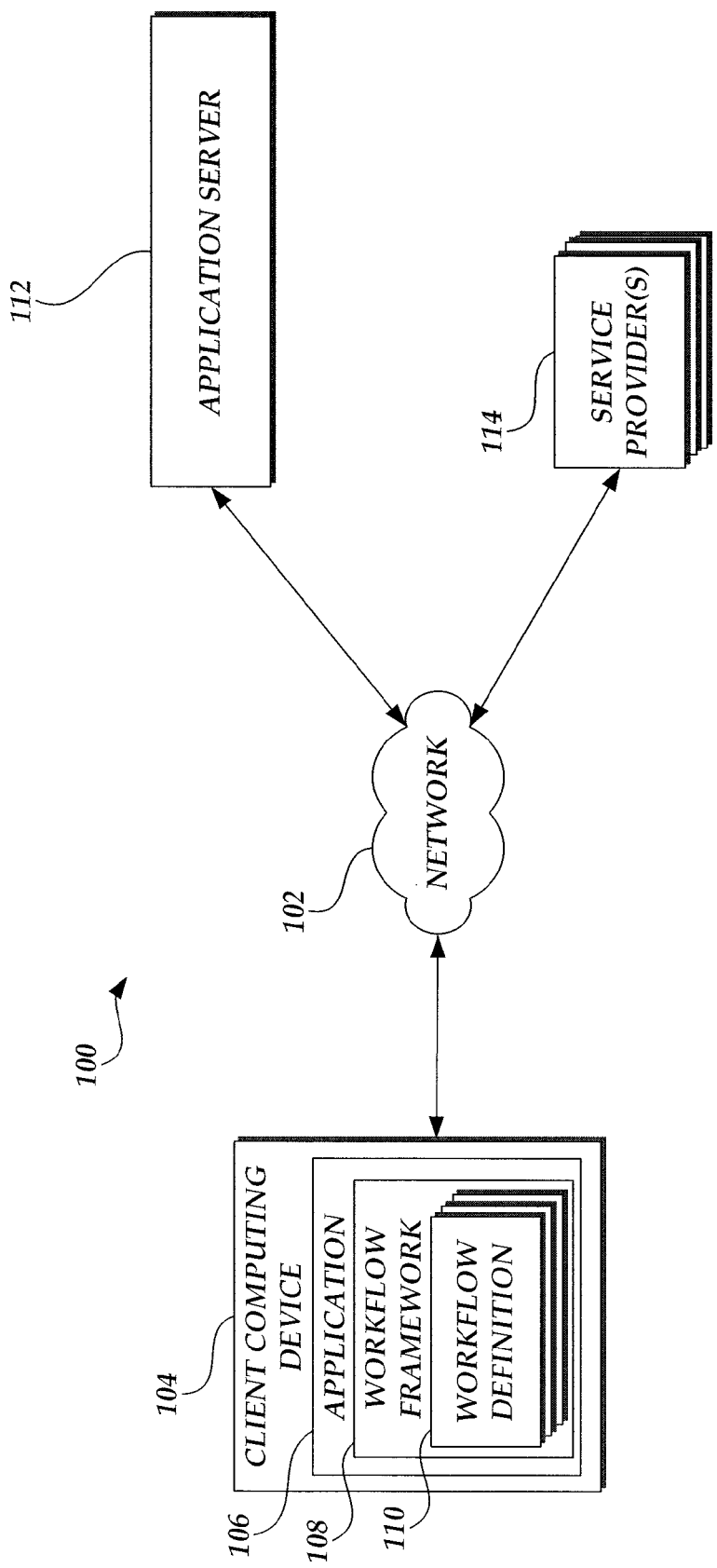
FIG. 1 illustrates a block diagram depicting an illustrative embodiment of a computing environment.

Generally described, the present disclosure relates to utilizing an application workflow framework to manage the implementation of workflows in applications executing on computing devices. Illustratively, aspects of the execution of an application by a computing device can be characterized as a workflow routine that can include multiple tasks that need to be executed in order to complete the workflow routine. Accordingly, an application can have a workflow definition that matches a specific workflow routine that can be implemented by a workflow framework. More specifically, in an illustrative embodiment, the specific tasks defined within the workflow routine can be associated with a number of interface elements within the application. Illustratively, at least some of the interface elements can have a number of states of execution defined by the workflow definition and related to progression of the workflow. In one embodiment, the states of execution can be a pre-active state, an active state, and a post-active state.

The workflow framework provides, or is otherwise associated with, an interface display area that can display, through the computing device display, all of the interface elements in some manner. As a user interacts with the application and progresses through the application workflow, interface elements within the interface display area are displayed in accordance with the current progression through the workflow. For example, interface elements for workflow steps that have not yet been completed are represented in accordance with the pre-active state, interface elements for a current workflow step are represented in accordance with the active state, and interface elements for workflow steps that have been completed are represented in accordance with the post-active state.

Illustratively, the interface element in the active state can be configured to provide one or more input controls that allow the user to provide information to the application in order to complete a task associated with the interface element. The interface element can transition from the active state to a post-active state after the user has provided the requested information or if the user has progressed along the workflow beyond where the task is defined. An interface element in a post-active state can indicate that the tasks associated with the interface element have been completed. In the post-active state the interface element can display an indication that the task associated with the interface element has been completed. In one embodiment, the interface element in the post-active state can display information on the interface element based, at least in part, on input provided by the user.

Illustratively, the user can progress through the different states of execution by interacting with different interface elements within the same interface display area. As the user progresses through the defined workflow for the application, the interface elements can change within the display area to display the information associated with each state of execution. More specifically, in an illustrative embodiment, interface elements corresponding to active state can be positioned in a focal point of the display area. Positioning of the interface in a focal point can help to focus the attention of the user on the active task that needs to be completed. In contrast, interface elements corresponding to either the pre-active state or the post-active state may be positioned in non-focal points of the display area. Accordingly, the user can progress through states of execution of each interface element without leaving the interface display area, including moving to or selecting different tasks non-sequentially. In some embodiments, the user can modify a previously completed task by reselecting the interface element.

The presentation of the tasks in this manner can help a user navigate through each task associated with the workflow routine without having to transition between multiple pages. This framework can help reduce consumer frustration by providing a streamlined interface that allows a user to complete a workflow routine without being distracted or confused by a cumbersome workflow interface.

Although aspects of the present disclosure will be described with regard to an illustrative workflow framework, one skilled in the relevant art will appreciate that the disclosed embodiments are illustrative in nature and should not be construed as limiting. Still further, although a number of illustrative examples will be discussed with regard to the present disclosure, such examples should not necessarily be construed as limiting.

FIG. 1 illustrates a block diagram depicting an illustrative embodiment of a computing environment 100 for implementing applications utilizing a workflow framework 108 on client computing devices 104. The client computing devices 104 are configured to communicate with an application server 112 and service providers 114 via the network 102. Applications 106 can be installed and operated on the client computing devices 104. The workflow framework 108 can be used to implement workflow routines within the application 104. Each workflow routine can be associated with a specific workflow definition 110 and executed on the client computing device 104.

The client computing device 104 can interact with the application server 112 and service providers 114 during execution of certain aspects of the workflow routines. The client computing devices 104 can receive the applications from the application server 112. In some embodiments, the application server 112 can enable communications between the client computing device 104 and a service provider 114 during the execution of a workflow routine. The application server 112 may be embodied by a plurality of computing devices or servers.

The service providers 114 are configured to communicate through the network 102 with the client computing device 104 and the application server 112. In an illustrative embodiment, the service providers 114 can include services offered by a network service provider or a third party providing content or services over the network 102. Examples of service providers can include retailers, digital content providers, banks, and other service providers.

Those skilled in the art will appreciate that the communication network 102 may be any wired network, wireless network or combination thereof. In addition, the communication network 102 may be a personal area network, local area network, wide area network, cable network, satellite network, cellular telephone network or combination thereof. Protocols and components for communicating via the Internet or any of the other aforementioned types of communication networks are well known to those skilled in the art of computer communications and thus, need not be described in more detail herein.

The client computing devices 104 can correspond to a wide variety of devices or components that are capable of initiating, receiving or facilitating communications over the communication network 102 including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the client computing devices 104 include a wide variety of software and hardware components for establishing communications over one or more communication networks, including wireless communication network, a wired communication network, or an IP-based telecommunication network. Illustrative components of a client computing device 104 will be described in greater detail with regard to FIG. 2.

Figure 2:
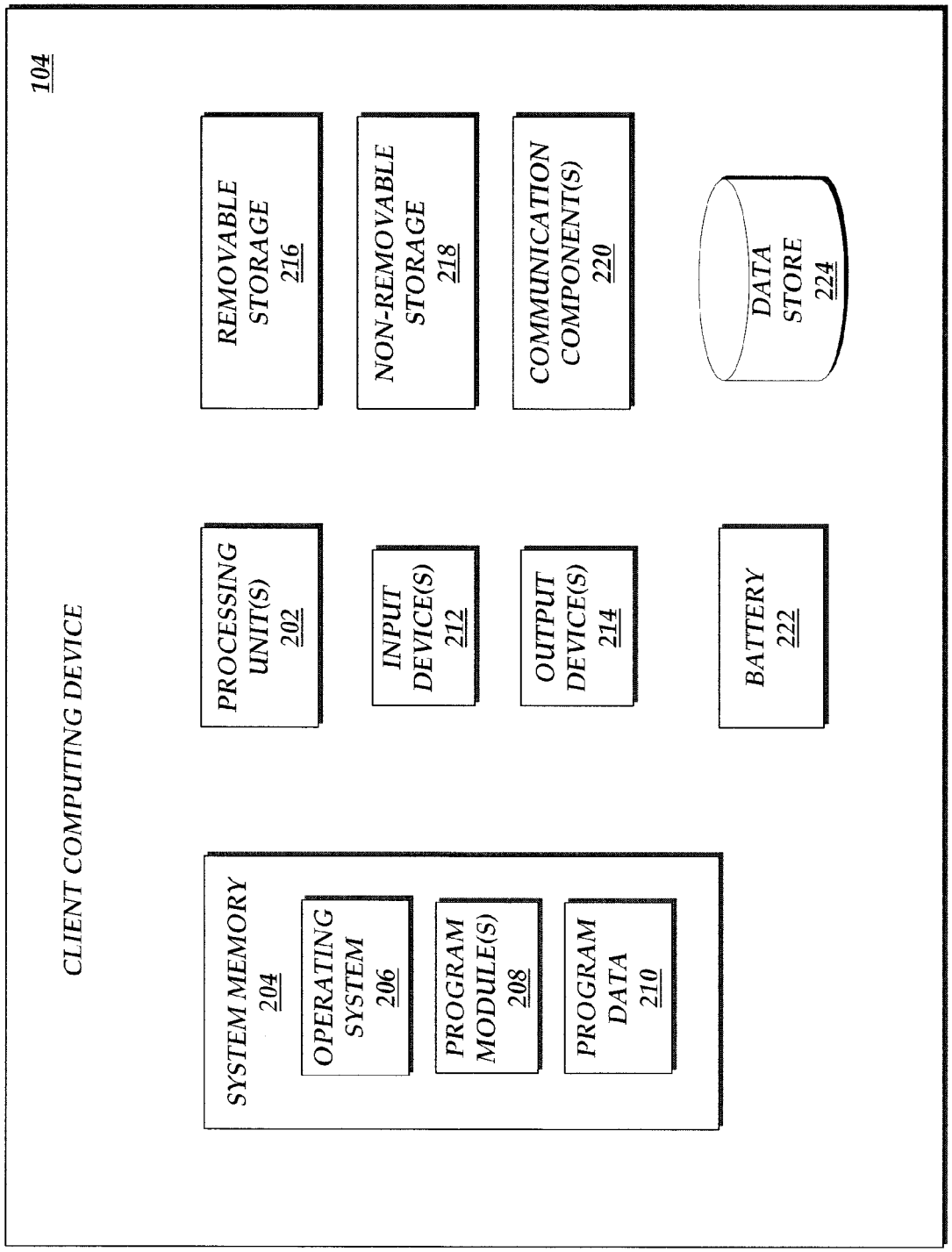
FIG. 2 illustrates components of an embodiment of a client computing device.

FIG. 2 illustrates components of an embodiment of a client computing device 104, such as a mobile telephone. The client computing device 104 may include one or more processing units 202, such as one or more CPUs. The client computing device 104 may also include system memory 204, which may correspond to any combination of volatile and/or non-volatile computer-readable storage media. The system memory 204 may store information which provides an operating system module 206, various program modules 208, program data 210, and other modules. In one embodiment, illustrative workflow framework functionality may be implemented as part of the operating system module 206. In such an embodiment, the operating system module 206 would include executable code that would receive a definition or configuration of application workflow routines, described below, and cause interface elements associated with application workflow routine to be displayed in accordance with the workflow definition 110. In another embodiment, illustrative workflow framework functionality may be implemented as part of an application 106 or module executed on the computing device 104, independent of the application to be executed on the computing device. In such an embodiment, the application 106 would include executable code that would receive a definition or configuration of application workflow routines and cause interface elements associated with application workflow routine to be displayed in accordance with the workflow definition 110. In a further embodiment, illustrative workflow functionality may be implemented as part of the application 106 to be executed and stored in the program data 210. In this embodiment, the application 106 would include executable code that would receive a definition or configuration of the application workflow 108 and cause interface elements associated with application to be displayed in accordance with the workflow definition 110.

The above-enumerated list of components is representative and is not exhaustive of the types of functions performed, or components implemented, by the client computing device 104. One skilled in the relevant art will appreciate that additional or alternative components may also be included in the client computing device 104 to carry out other intended functions such as mobile telephone functions.

The client computing device 104 performs functions by using the processing unit(s) 202 to execute modules stored in the system memory 204. The client computing device 104 may also include one or more input devices 212 (keyboard, mouse device, specialized selection keys, etc.) and one or more output devices 214 (displays, printers, audio output mechanisms, etc.). One skilled in the relevant art will appreciate that additional or alternative software modules and/or hardware components may also be included in the client computing device 104 to carry out other intended functions such as mobile telephone functions.

With continued reference to FIG. 2, the client computing device 104 may also include a battery 222, one or more types of removable storage 216 and one or more types of non-removable storage 218. In some embodiments the device can be connected to an external power source, such as an AC power outlet. Still further, the client computing device 104 can include communication components 220, such as a cellular transceiver and a wireless transceiver, for facilitating communication via wired and wireless communication networks. These transceivers facilitate such communication using various communication protocols including, but not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on code division multiplex access (CDMA), time division multiple access (TDMA), global system for mobile communications (GSM), wireband code division multiplex access (WCDMA), code division multiplex access $3^{rd}$ generation (CDMA1040), time division synchronous code division multiple access (TD-SCDMA), wavelength and time division multiple access (WTDMA), long term evolution (LTE), orthogonal frequency division multiple access (OFDMA), and similar technologies).

FIGS. 3A-3C illustrate embodiments of a client computing device 104 that are configured to implement an application 106 utilizing an application workflow framework 108. As previously described, illustratively, a workflow framework 108 can manage a workflow routine defined for an application 106 being executed on a computing device, such as a mobile computing device. The workflow routine can include multiple tasks than need to be completed in order to complete the routine. The workflow framework 108 can have a workflow definition 110 associated with each workflow routine. Each of the specific tasks defined in the workflow routine can be represented by a number of interface elements within the application 106. The workflow definition 110 can define states of execution for at least some of the interface elements within the application 106.

With reference to FIG. 3A, the client computing device 104 has a user interface 310 with an interface display area 320. The size of the user interface 310 can be defined by the characteristics of the computing device 104. The interface display area 320 represents the area within the user interface 310 that can be utilized to display the contents of the application 106. In some embodiments, the application 106 can have a plurality of interface display areas 320 that are configured in accordance with the workflow framework 108. The interface display area 320 can be configured to display a plurality of interface elements 340A-E. In some embodiments the interface display area 320 can be larger than the user interface 310 of the client computing device 104. In these instances, the interface display area 320 can be configured to move vertically, horizontally, or diagonally within the user interface 310 in order to view the entire interface display area 320.

The workflow definition 110 can define states of execution for the interface elements 340. In one embodiment, the interface elements 340 are can have a first state, also referred to as a pre-active state, a second state, also referred to as an active state, and a third state, also referred to as a post-active state. The pre-active state and post-active state can also be referred to as inactive states. The state of each interface element 340 is independent of the state of other interface elements 340. For example, in FIG. 3A, the interface elements 340A-E are in pre-active states. In FIG. 3B interface element 340B is displayed in an active state. In FIG. 3C interface element 340B is displayed in a post-active state and interface elements 340A and 340C-E are displayed in pre-active states. In some embodiments, only a single interface element can be in an active state. In some embodiments more than one interface element can be in an active state simultaneously. Additionally, in further embodiments, the client computing device 104 can have interface elements associated with more than on state in memory to facilitate switching between states with minimal impact.

Illustratively, the workflow framework 108 can define a focal point 330 within the user interface 310. In some embodiments, the position of the focal point 330 can be based on characteristics of the client computing device 104, such as the size of the screen, resolution, and other device characteristics. In some embodiments the workflow framework 108 can have more than one focal point 330. The focal point 330 in FIG. 3B is positioned substantially in the middle of the interface display area 320. In a different instance, the focal point 330 could be positioned at other locations in the interface display area 320, such as the upper or lower portion of the display. The active interface element 340 can be positioned based, at least in part, on the location of the focal point 330. The focal position of the active element can also be referred to as a prioritized position. When no elements are in an active state, the interface elements transition back to a previous display state where none of the interface elements have a prioritized position in the interface display area 320. The usage of the focal point 330 can help the user to focus on the active interface element.

The workflow definition 110 defines one or more display characteristics associated with each interface element 340. The display characteristics can define the appearance of the interface element 340 within the application display area 320. The display characteristics can include, for example, size, shape, color, display information, such as text, icons, graphics or other display information. In this embodiment, the interface elements 340A-E are substantially rectangular. In some embodiments the interface elements could be any one of a variety of shapes, including but not limited to, squares, circles or other shapes.

Illustratively, the interface elements 340 can have one or more different display characteristics dependent on the current state of the interface element. When an interface element transitions from the pre-active state to an active state, the interface element display characteristics can change based on the workflow definition 110. For example, the interface element can increase in size in the active state compared to the pre-active state. This is illustrated in FIGS. 3A and 3B by interface element 340B. In FIG. 3B the interface element 340C expands in size and displays an input control 350 and descriptor 360. When the interface element 340B transitions to the active state, the application 106 does not transition to a new page, rather the other interface elements 340A and 340C-E are repositioned to accommodate the active interface element 340C. Some interface elements can still be seen (e.g., 340A, 340C), whereas others are positioned outside of the visible display (e.g. 340D-E), but still within the interface display area 320. The interface display area 320 can be moved (e.g., scrolling) to view the interface elements 340D-E that are not visible while interface element 340B is active. This can help provide the user context when completing the tasks associated with interface element 340B.

In the active state, an interface element 340 can include one or more input controls 350. The input control 350 is configured provides an interface for a user to provide input data to the application. The input controls 350 can include, for example, a dropdown box, a text field, a scroll bar, a spinning input, a scrolling input, a horizontal bar input, a numerical input, an alphanumeric input, and/or other types of input controls configured to allow a user to provide input to the application. An interface element can have any number of input controls. The interface element can have one or more functions associated with the input controls that are implemented after the application 106 has received input data from a user.

In some embodiments the workflow definition 110 can define one or more active state layers associated with the interface element 340. For each layer the workflow definition 110 can define display characteristics associated with the interface element 340. The display characteristics can be different than the display characteristics associated with other states or other active state layers. In some embodiments a base layer defines a form factor (i.e., size and shape) of the layer and subsequent layers define information displayed within the form factor defined by the base layer.

When an interface element 340 transitions from the active state to a post-active state, the interface element display characteristics can change based on the workflow definition 110. For the post-active state the workflow definition 110 can define one or more display characteristics associated with the interface element. The one or more display characteristics can be different than the display characteristics associated with the active state or pre-active state. For example, with reference FIGS. 3B and 3C, the interface element 340B decreases in size in the post-active state as compared to the active state. The interface element 340B in the post-active state can be configured to be the same size as during the pre-active state, as illustrated in FIGS. 3A and 3C. In some embodiments, the interface element can have a different form factor in the post-active state than in the pre-active state. The display characteristics can also be configured to display information 370 on the interface element that is different from the information displayed in the pre-active state. In some embodiments, the information displayed can be based, at least in part, on input provided by the user during the active state. In some embodiments, the interface element may display a checkmark or an X or other indicia indicating that the interface element 340 has been completed and requires no further input from a user. As previously described, the client computing device 102 can maintain the active and passive state display elements in memory to facilitate transition.

Figure 4B:
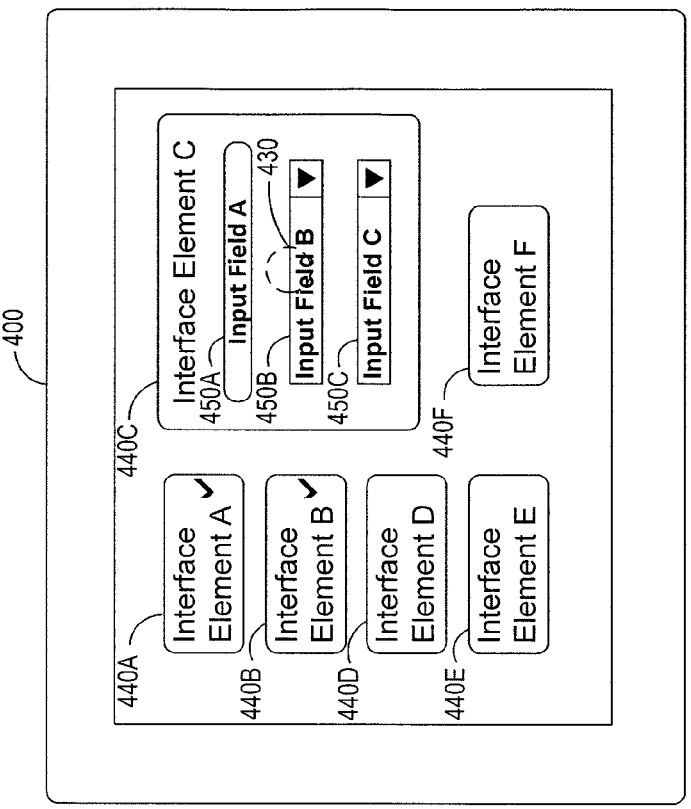
FIGS. 4A and 4B illustrate another embodiment of a client computing device that is configured to implement an application workflow framework.
Figure 4A:
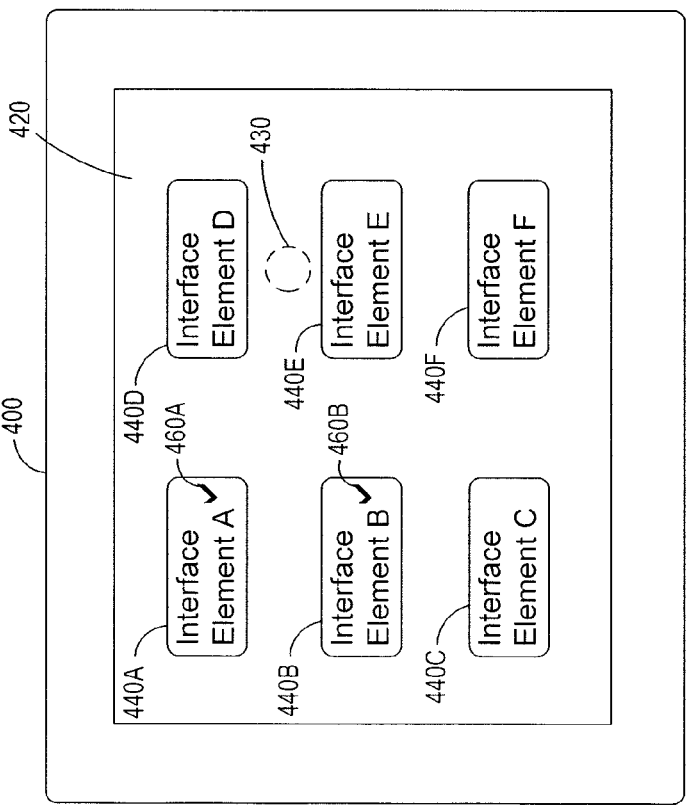

FIGS. 4A and 4B illustrate a workflow application operating on another embodiment of a client computing device 400 having a different display area, such as a tablet computing device. The client computing device 400 has a user interface 410 and the interface display area 420 with a plurality of interface elements 440A-F. The dashed circle represents a focal point 430 within the user interface 410. The focal point 430 can be defined by the workflow framework 108. In FIG. 4A the interface elements 440A-F are in inactive states, wherein none of the interface elements are being positioned relative to the focal point 430. Interface elements 440A-B are in post-active states and interface elements 440C-F are in a post-active states. It is readily discernible that interface elements 440A-B are in post-active states because of the post state indicia (i.e., checkmarks) 460A-B. It is also readily discernible that interface elements 440C-F are in a pre-active because of the absence of any post-state indicia.

In FIG. 4B, interface element 440C has transitioned from the pre-active state to an active state. The interface element 440C moved from the previous position within the interface display area 420 to be substantially aligned with the focal point 430. In the active state, the interface element 440C changed size to display a plurality of input controls 450A-C as defined by the workflow definition 110. In this embodiment, the other interface elements 440A-B and 440D-F were repositioned in order to accommodate the new position and shape of interface element 440C. In some embodiments, the workflow definition 110 can define how the interface elements are repositioned when an interface element transitions to a focal point. For example, in this embodiment, four interface elements are displayed on the left side of the user interface and the fifth interface element is displayed below the active interface element 440C.

Figure 5C:
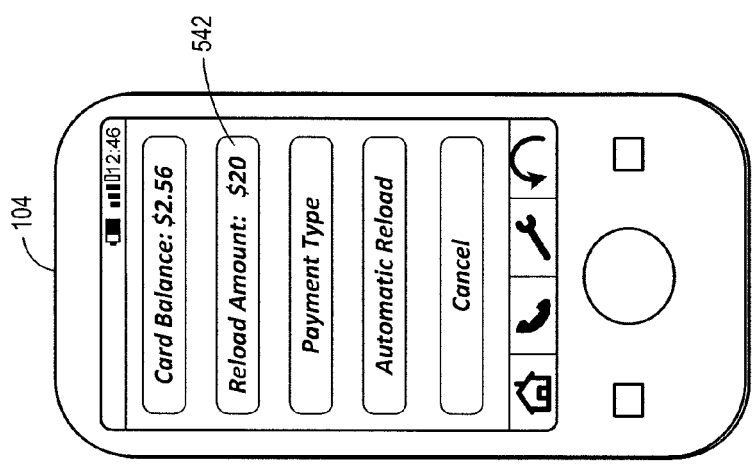
FIGS. 5A-5C provide an illustrative embodiment of a payment processing application implementing a workflow application framework.
Figure 5B:
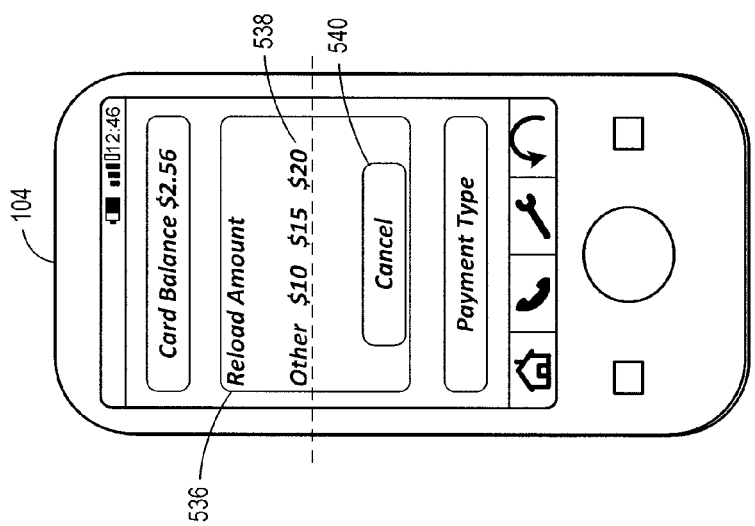
Figure 5A:
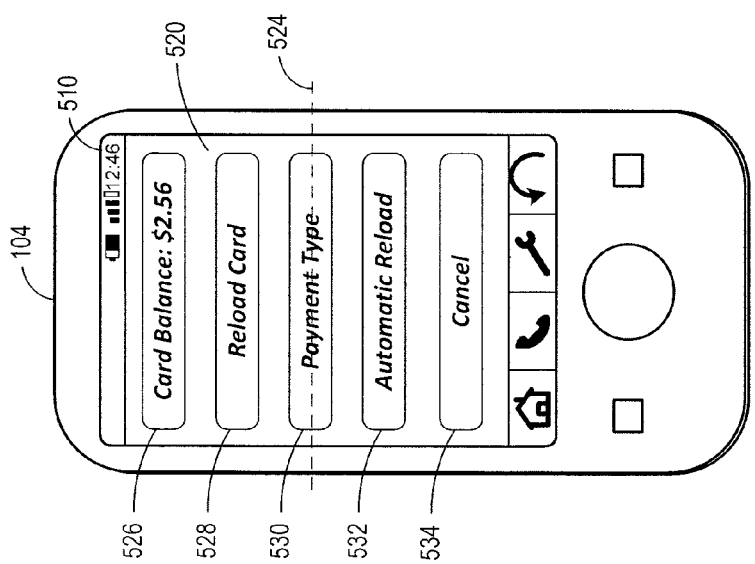

FIGS. 5A-5C provide an illustrative embodiment of a payment processing application implementing an application workflow framework. In this embodiment there is a user interface 510, an interface display area 520, a focal point 524 and a plurality of interface elements, including card balance 526, reload card 528, payment type 530, automatic reload 532 and a cancel input 534. Each interface element is defined in accordance with a workflow definition 110. In this embodiment, the focal point 524 is positioned substantially in the middle of the user interface 510. As will be described below, FIG. 5A displays each interface elements in a pre-active state. FIG. 5B displays the reload card interface element 528 after it has transitioned from the pre-active state to an active state. FIG. 5C displays the reload card interface element 528 after it has transitioned from the active state to a post-active state. The other elements including card balance 526, payment type 530, automatic reload 532 and cancel 534 remain in the pre-active state.

With reference now to FIG. 5A, in the beginning of the workflow routine, the interface elements are each displayed in a pre-active state. In the pre-active state, the workflow definition 110 determines the text, size, shape, color and other display characteristics of the interface element. A user can select one of the interface elements in order to transition the interface element from the pre-active state to the active state. The user input may be received by touching the user interface on a touchscreen device, via a peripheral device such as a mouse or keyboard, or by another method of providing input to the application. When an input is received, the selected interface element 528 transitions from the pre-active state to an active state. The selected interface element 528 can be repositioned so that it substantially aligns with the focal point 524. The unselected interface elements can be repositioned based on the new position of the active interface element 528. An interface element can be placed in the focal point if no element is in an active state.

FIG. 5B displays the reload card interface element 528 after it has transitioned from the pre-active state to an active state. The reload card interface element 528 is now positioned substantially at the focal point 524. The other interface elements are moved within the interface display area to accommodate the active interface element 528. The card balance 526 and payment type 530 elements are still visible within the interface display area 520. The interface element 528 transitions to the focal point 524 within the interface display area 520 and does not transition to a different screen within the application. Rather, the interface display area 520 can have a control that can be manipulated (e.g., scrolling) in order to view elements that are not within the visible display area. As illustrated, the display characteristics of the reload card element 528 in the active state are different from the display characteristics of the pre-active state. Specifically, in the active state, the reload card element 528 expands in size to display a descriptor 536, an input control 538 and a cancel input 540. The input control 538 allows the user to select a monetary value for a reload amount. For example, the user could select $10.00, $15.00, $20.00 or "Other." If the user selects "Other," the workflow definition 110 can define an additional input control. For example, a text input control could be displayed that would allow the user to input a specific amount of money. The cancel input control 540 can cause the element to transition from the active state back to the pre-active state, in accordance with the workflow definition 110. Based on the user input the interface element can transition to additional layers within the active state (e.g., selecting "Other"), back to the pre-active state (e.g., selecting the cancel input), or to the post-active state (e.g., selecting a monetary value) in accordance with the workflow definition 110.

FIG. 5C displays the reload card element 528 in the post-active state.

During the active state, the user selected $20. After the user provided input, the reload card element 528 transitioned from the active state to the post-active state. As illustrated, the display characteristics of the reload card element 528 in the post-active state are different from the display characteristics during the active state. In the post-active state the reload card element 528 can display information 542 based, at least in part, on user input received during the active state. For example, in this instance, the reload card interface element 528 has changed from "Reload Card" in the pre-active state to "Reload Amount: $20" in the post-active state, showing the specific monetary value that the user selected. This is advantageous because the user can determine previous selections without reselecting the interface element. Additionally, when the reload card element 528 transitioned from the active state to the post-active state, the reload card element 528 moved from the focal point 524 to a non-focal point.

Figures 6A, 6B, 6C:
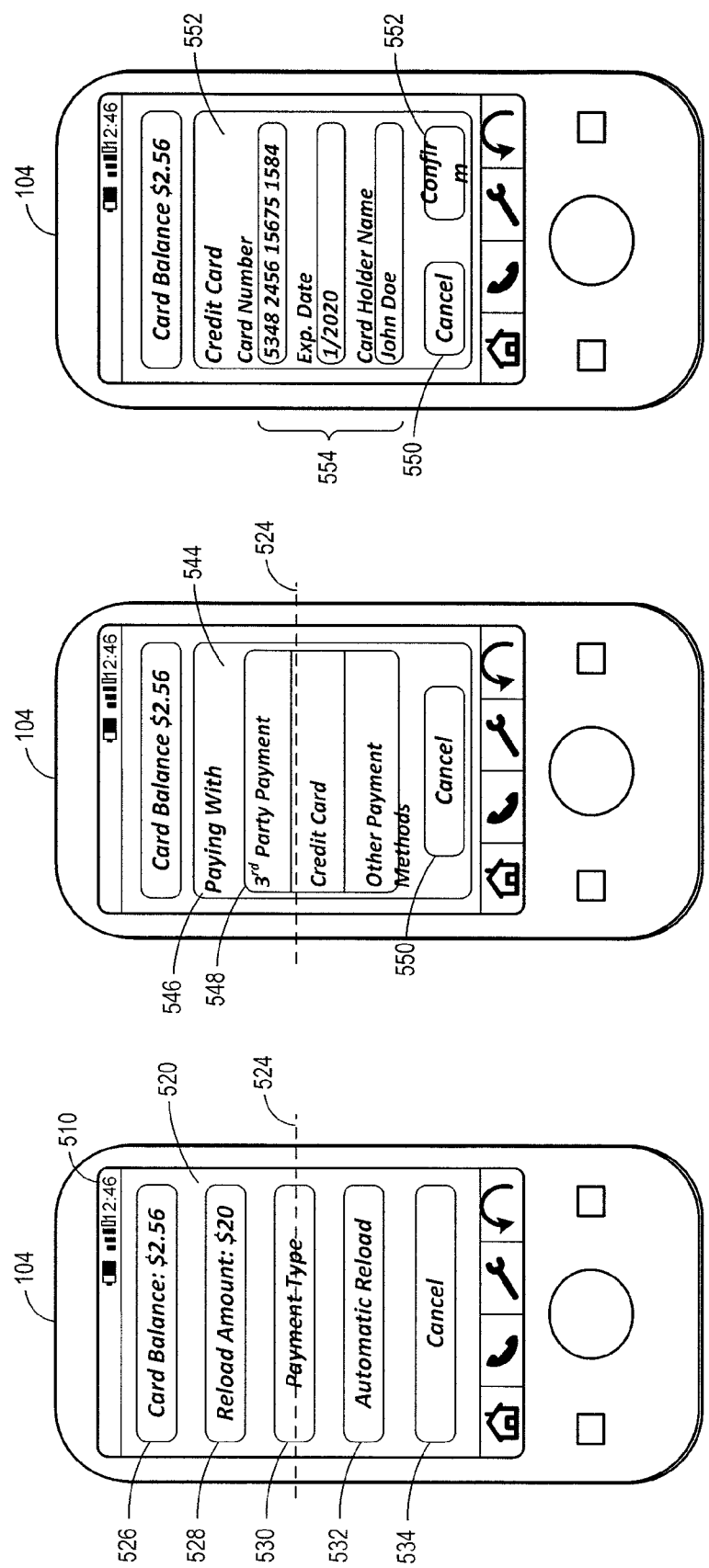
FIGS. 6A-6G provide another illustrative embodiment of a payment processing application implementing a workflow application framework.

FIGS. 6A-6G illustrate another illustrative example of execution of the application workflow framework having a plurality of active state layers within the payment processing application. In FIG. 6A the payment type interface element 530 is in a pre-active state.

In FIG. 6B the payment type element 530 transitions from the pre-active state to the active state. In the active state, the payment type element 530 is positioned substantially at the focal point within the interface display area 520. The other interface elements are moved relative to the position and size of the payment type element 530. In this instance, only the card balance interface element 526 is visible when the payment type interface element 530 is active. The other elements can be viewed by manipulating the interface display area 520 (e.g., scrolling). In some embodiments, the workflow definition 110 can define specific elements or information that can remain stationary within the interface display area 520 so that it can be displayed regardless of the active interface element. This can help provide contextual information regarding the active interface element. In some embodiments, interface elements may be linked so that designated inactive interface elements are displayed at the same time as a specific active element. For example, in one embodiment, the reload amount element 528 could be displayed instead of the card balance element 526 because the reload amount may help or influence the user's selection of a specific payment type.

The active state of the payment type element 530 comprises a plurality of active state layers. FIG. 6B displays the base layer or first layer 544. The display characteristics of the first layer 544 include a descriptor 546, which can provide descriptive information regarding the payment type input control 548. The payment type input control 548 comprises different options for payment, including a third party payment option (e.g., PayPal®), credit card and other payment methods. The first layer also includes a cancel input 550.

In FIG. 6C, after the credit card input is received by the application on the first layer 544, the active state transitions from the first layer to the credit card payment layer or second layer 552. The display characteristics of the second layer 544 include a plurality of credit card control inputs 554 configured to receive information associated with the user's credit card (e.g., card number, expiration date, cardholder name). As illustrated, an active state can comprise one or more layers, with each layer providing different display characteristics and input controls. The application can transition between layers without transitioning from the current interface display screen.

After the user has completed the information the user can select confirm 552 or cancel 550. If the cancel input 550 is selected the application could transition from the second page 552 back to the first page 544 in accordance with the workflow definition 110. In some instances, the cancel input 550 may transition the user back to the state displayed in FIG. 6A. If the confirm input is received then the payment type element 530 transitions from the active state to the post-active state in accordance with the workflow definition 110. After the user input is provided and prior to transitioning to the post-active state, the application can execute one or more functions associated with the user input, such as verification of funds, or other functions in accordance with the workflow definition 110.

Figures 6D, 6E:
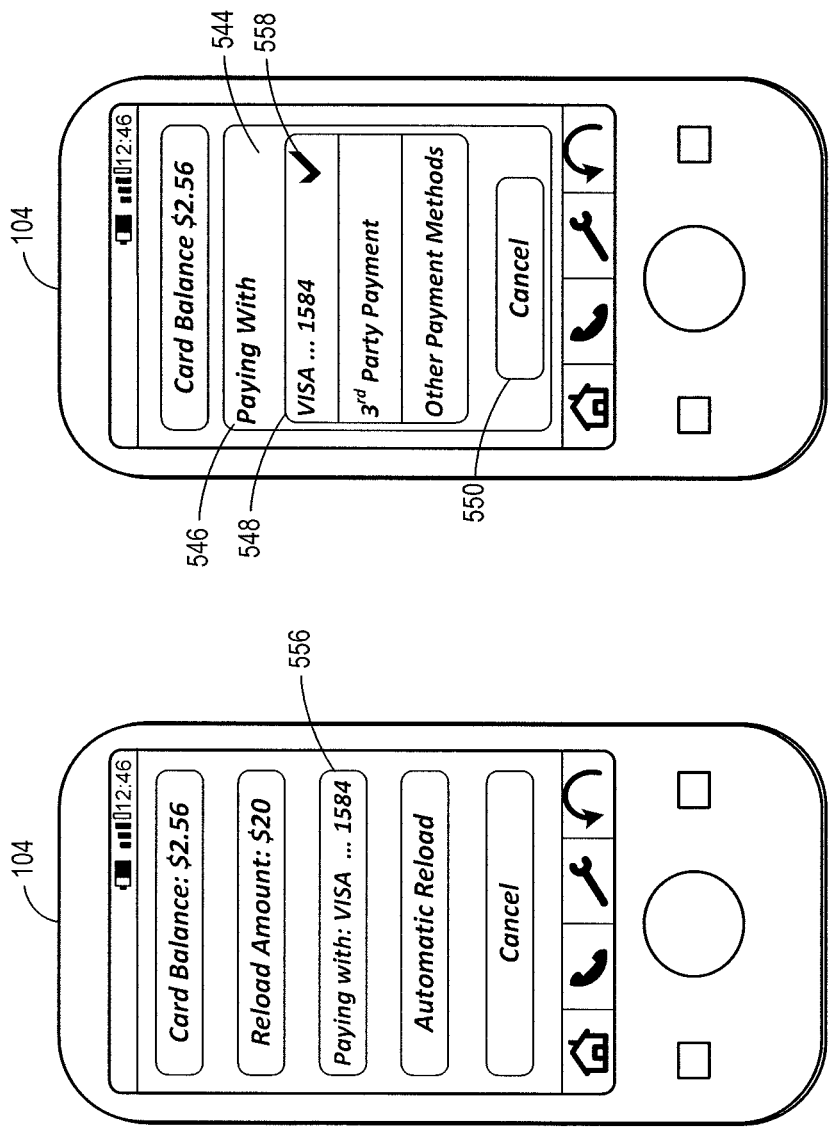

FIG. 6D displays the payment type element 530 in the post-active state. As illustrated, the display characteristics of the payment type element 530 in the post-active state are different from the display characteristics during the active state. In the post-active state the payment type element 530 can display information 556 based, at least in part, on user input received during the active state. For example, in this instance, the payment type element 530 has changed from "Payment Type" in the pre-active state to "Paying with" VISA . . . 1584" in the post-active state. The user information displayed in the post-active state is defined in accordance with the workflow definition 110. In this embodiment the user provided information about a credit card and the display information 556 displays the type of credit card and the last four digits of the credit card number. In other embodiments the workflow definition 110 could define other information to be displayed.

FIG. 6E illustrates when the application 106 receives an input to select the payment type interface element 530 again, which causes the payment type element 530 to transition from the post-active state to the active state. In the active state, the first layer 544 is displayed again showing information based, at least in part, on previous input from the user. As illustrated, the previously provided information is displayed to the user rather than resetting or erasing the information associated with the element. For example, information regarding the previous payment information is displayed in the first position within the control 548 together with a display indicia 558 illustrating that it is the currently selected option. The input control 544 also displays the other available payment options that were previously displayed.

Figures 6F, 6G:
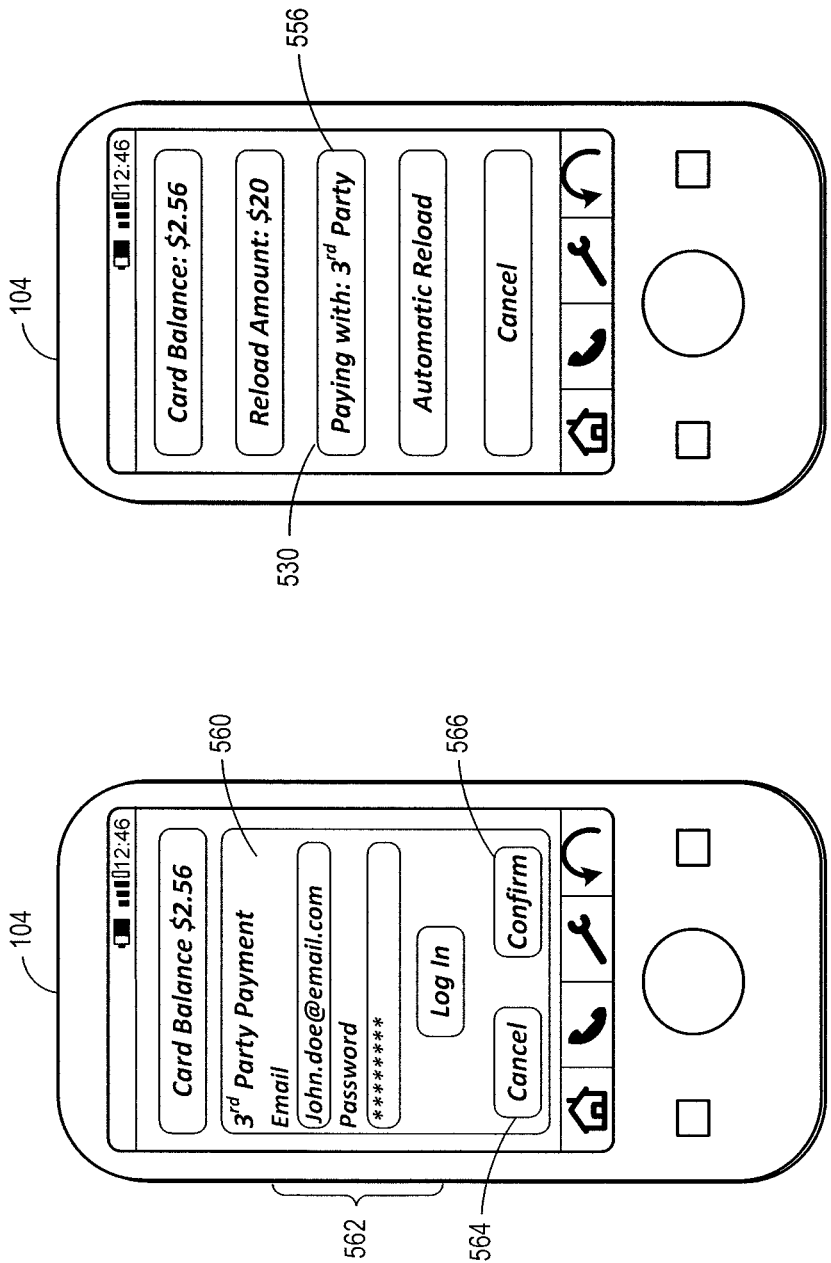

FIG. 6F illustrates the application after receiving an input to select third party payment. The third party payment option layer or third layer 560 of the active state is displayed. The display characteristics of the third layer 560 include a plurality of third party payment control inputs 562 configured to receive information associated with the third party payment account (e.g., email and password). After the user input is provided, the application 106 can execute one or more functions associated with the user input, such as logging in to the user's account, verification of funds, or other functions in accordance with the workflow definition 110. The workflow definition 110 can also execute one or more functions within the active state. For example, when an e-mail address and password are provided, and the log in action is selected, the workflow definition 110 can execute a function that logs the user into an account and verifies the availability of funds. In some instances, the application 106 may provide one or more additional layers prior to finishing execution of the active state for the interface element.

FIG. 6G illustrates the transition of the payment type element 530 from the active state to the post-active state. The display information 556 in the post-active state has been updated to account for the change in user input. The display information 556 now displays that the user is paying with a third party payment provider as opposed to the credit card.

Figure 7:
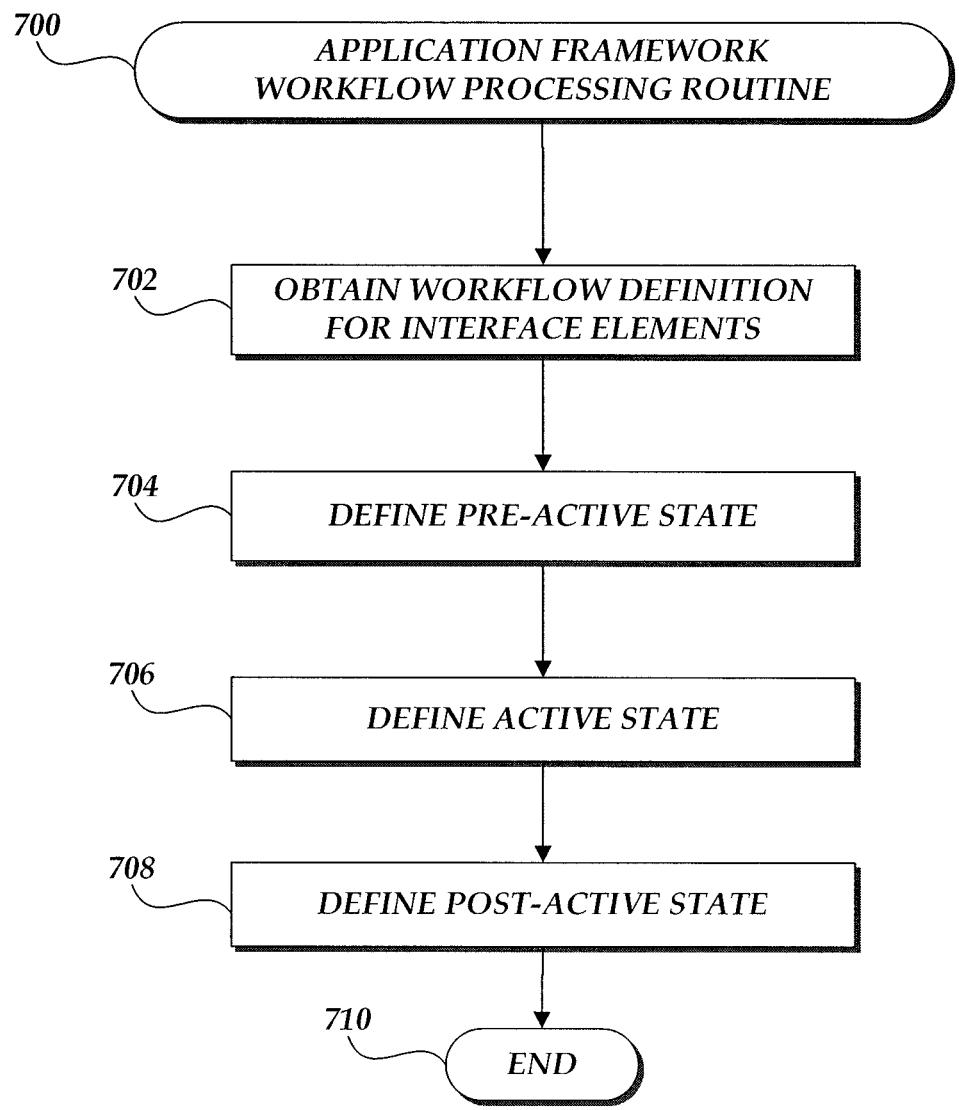
FIG. 7 is an embodiment of a flow diagram depicting an illustrative workflow application framework processing routine.

FIG. 7 shows an illustrative block diagram for an application framework workflow processing routine. A workflow framework 108 has a workflow definition 110 that matches a specific workflow routine. An application 104 can have a specific workflow definition 110 for each workflow routine within the application. The workflow framework 108 can be implemented as part of an operating system module 206, as part of an application or module executed on the computing device 104, or integrated within the application 106 to be executed on the computing device.

At block 702, a workflow definition 110 for an application workflow routine is obtained that defines states of execution for a plurality of interface elements within the application 106. For at least a subset of the interface elements, the workflow definition 110 defines a pre-active state, an active state, and a post-active state. In some embodiments, the workflow definition 110 associated with the application 106 can also define a focal point associated with the application display area. In some embodiments, the focal point can be defined by the workflow framework 108 and the workflow definition 110 can define the position of interface elements relative to the defined focal point. In some embodiments, the workflow framework 108 can add or modify workflow definitions 110 based on historical information, user preferences or default values. For example, if one or more state definitions within the workflow definition 110 are missing, the workflow framework 108 can define the missing state definition.

At block 704, the workflow definition 110 defines a pre-active state for the interface element. For the pre-active state the workflow definition 110 defines one or more display characteristics associated with the interface element. The display characteristics can define the appearance of the interface element within the application display area. The display characteristics can include, for example, size, shape, color, display information, such as text, icons, graphics and/or other display information.

At block 706, the workflow definition 110 defines an active state for the interface element. For the active state, the workflow definition 110 can define one or more active state layers associated with the interface element. For each layer the workflow definition 110 can define one or more display characteristics associated with the interface element. The one or more display characteristics can be different that the display characteristics associated with the pre-active state. The display characteristics can define the appearance of the interface element within the application display area. For example, the interface element can increase in size in the active state as compared to the pre-active state. Each layer can have different display characteristics. In some embodiments a base layer defines a form factor (i.e., size and shape) of the layer and subsequent layers define display characteristics within the defined form factor. In some embodiments, the workflow definition 110 can modify the display characteristics of non-active interface elements in order to highlight or focus the attention of the user on the active element. For example, the intensity of the inactive elements can be lessened, grayed out or other change made.

The workflow definition 110 can also define one or more input controls for each layer in the active state. The input controls provide an interface for a user to provide input to the application. The input controls can include, for example, a dropdown box, a text field, a scroll bar, a spinning input, a scrolling input, a horizontal bar, a numerical input, an alphanumeric input or any other type of input that allows a user to provide input to the application. The workflow definition 110 can also define one or more functions or subroutines that are executed based on input provided by the user in the active state.

At block 708, the workflow definition 110 defines a post-active state for the interface element. For the post-active state the workflow definition 110 defines one or more display characteristics associated with the interface element. The one or more display characteristics can be different that the display characteristics associated with the active state. For example, the interface element can decrease in size in the active state compared to the active state. The interface element in the post-active state can be configured to be the same size as during the pre-active state. In some embodiments, the post-active state can have a different form factor than the pre-active state. The display characteristics can also be configured to display information on the interface element based, at least in part, on input provided by the user during the active state. In some embodiments the interface element may display a checkmark an X, or some other indication showing that the interface element has been completed and requires no further input. At block 710, the application framework workflow processing routine ends.

Figure 8:
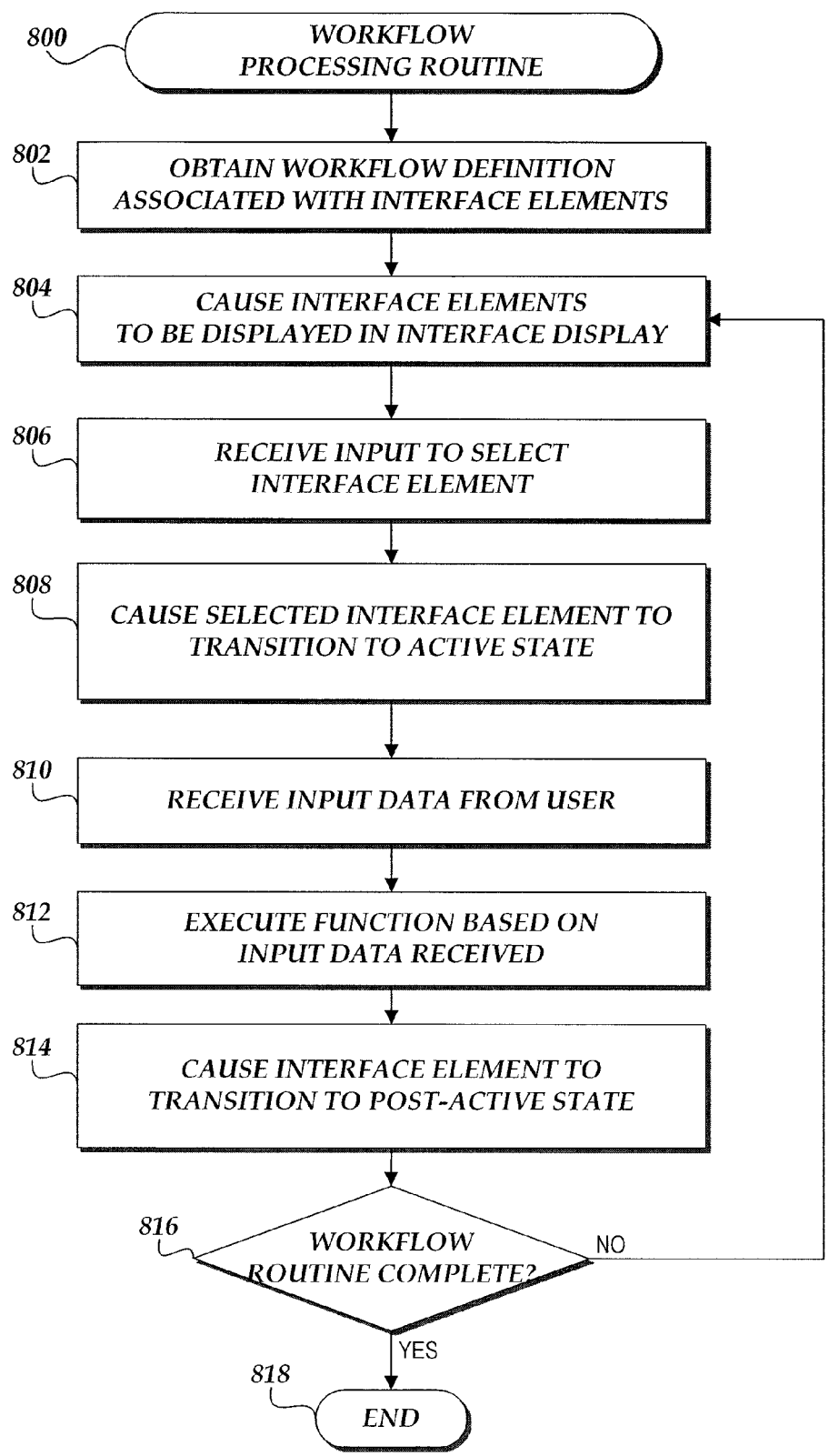
FIG. 8 is an embodiment of a flow diagram depicting an illustrative workflow processing routine.

FIG. 8 shows an illustrative block diagram for a workflow processing routine 800. The workflow processing routine 800 can be executed within an application 106. A workflow routine can include multiple tasks that need to be executed in order to complete the workflow routine. The application workflow framework 108 can manage a workflow routine within the application 106. The workflow framework 108 has a workflow definition 110 that matches the specific workflow routine.

At block 802, the application 106 obtains a workflow definition 110 for a specific workflow routine. As previously described, the workflow definition 110 defines at least a pre-active state, an active state, and a post-active state for a plurality of interface elements. An illustrative workflow definition routine was described in association with FIG. 7.

At block 804, the application causes interface elements to be displayed in an interface display area. The interface elements are displayed in an inactive state, in accordance with the current state of the interface element (e.g., pre-active state or post-active state). The application 106 causes the display of the interface element to change to the active state display in accordance with the workflow definition 110.

At block 806, the application 106 receives input from a user to select one of the plurality of interface elements. At block 808, the application 106 causes the selected interface element to transition to an active state. In the active state the interface element is positioned within the interface display area relative to a focal point and the display characteristics of the interface element are changed in accordance with the workflow definition 110. The active interface element can provide one or more user controls configured to receive input data from a user.

At block 810, the application receives input data from the user at the one or more input controls provided by the interface element. At block 812, the application can execute a function based on the input data received, such as authorization of financial information. In some embodiments, the application 106 can communicate with service providers to execute the function, such as a bank, in order to receive a verification of sufficient funds. After the function is completed the interface element can transition from the active state to a post-active state.

At block 814, the application 106 can cause the interface element to transition from the active state to a post-active state. The interface element also transitions from the focal point to a non-focal point. The application 106 causes the display of the interface element to change to the post-active state display in accordance with the workflow definition 110. The post-active interface can be configured to display information based, at least in part, on user data received during the active state.

At block 816, the application 110 determines whether the workflow routine is complete. If the workflow routine is complete workflow process ends at block 818. When the workflow routine ends, the user can be redirected within the application 106. For example, the user could be redirected to another portion of the application where a different workflow routine is to be implemented. In some instances the application 106 can terminate when the processing routine terminates. If the workflow routine is not complete the process returns to block 804 to continue implement the workflow routine.

All of the processes described herein may be embodied in, and fully automated via, software code modules executed by one or more general purpose computers or processors, which may also run in virtual machines on one or more physical computing units. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing system comprising:
a processor configured with processor-executable instructions to execute an application framework, the application framework including:
an application user interface, executable on the computing system, the application user interface having an interface display area defining a focal point, and a plurality of interface elements, each interface element configured to have an associated workflow definition defining states of execution for each interface element,
wherein the workflow definition defines:
a pre-active state having a first interface element display of a first size and shape within the application display area, wherein the first interface element display is configured to display pre-active state display data;
an active state having a second interface element display of a second size and shape within the application display area, wherein the second interface element display includes an input control configured to receive an input data, wherein the at least one interface element is configured to transform to the second size and shape to display the input control during the active state, wherein the input control is not visible during the pre-active state; and
a post-active state having a third interface element display of the first size and shape within the application display area, wherein the third interface element display is configured to (i) modify the pre-active state display data to display at least a portion of the input data received during the active state, and (ii) transform to the first size and shape when transitioning from the active state to the post-active state, wherein the input control is not visible during the post-active state;

wherein said each interface element is configured to transition from the pre-active state to the active state based on a selection of one of the interface elements in accordance with the workflow definition, wherein at least one interface element of said plurality of interface elements is configured to remain visible in a post-active state within the interface display area regardless of the interface element that is currently active within the interface display area, and wherein said each interface element is configured to transition to the focal point within the interface display area when the interface element transitions from the pre-active state to the active state.

2. The computing system of claim 1, wherein at least one function is associated with the active state that is configured to be executed based on input data received by the input control.

3. The computing system of claim 1, wherein the active state of at least one of the at least one interface element has two or more active state layers.

4. The computing system of claim 1, wherein the input control is one of a text input, a dropdown list, and a slider input.

5. The computing system of claim 1, wherein a plurality of interface elements are configured to transition from the focal point to a non-focal point within the interface display area when the interface element transitions from the active state to the post-active state.

6. The computing system of claim 1, wherein the first interface element display and the third interface element display are the same size.

7. The computing system of claim 1, wherein the second selection display area is larger than the first interface element display and the third interface element display.

8. The computing system of claim 1, wherein the at least one interface element is configured to be confined within the interface display area when transitioning between states.

9. A computer-implemented method for processing user input in an application framework, the method comprising:
obtaining a workflow definition defining states of operation for a plurality of interface elements;
displaying the plurality of interface elements in an application interface display of a user interface, wherein each of the interface elements has at least one display characteristic and displays first display data;
receiving an input to select one of the plurality of the interface elements, wherein a previously selected interface element received a first input prior to selection of the selected interface element;
changing at least one display characteristic of the selected interface element to display at least one input control in accordance with the workflow definition, wherein the at least one input control is not visible prior to selection of the interface element;
positioning the selected interface element such that it substantially aligns with a focal point within the application interface display in accordance with the workflow definition;
displaying the first input received from the previously selected interface element within the application interface display area regardless of the selected interface element that is currently active within the application interface display area;
receiving input data to the at least one input control;
executing at least one function associated with the input data received by the input control in accordance with a workflow definition; and
changing at least one display characteristic associated with the selected interface element such that the selected interface element (i) modifies the first display data to display at least a portion of the received input data, and (ii) hides the at least one input control.

10. The computer-implemented method of claim 9, wherein the states of operation comprise a pre-active state, an active state, and a post-active state.

11. The computer-implemented method of claim 10, wherein displaying the plurality of interface elements in an application interface display of a user interface occurs during the pre-active state.

12. The computer-implemented method of claim 9, wherein the changing of the at least one display characteristic of the selected interface element changes the size of the selected interface element.

13. The computer-implemented method of claim 9, wherein the size of the selectable interface element changes to accommodate the input parameters within the application interface display.

14. The computer-implemented method of claim 13, positioning the unselected interface elements to account for the change of size of the selected interface element.

15. The computer-implemented method of claim 9, wherein the selected interface does not change screens within the user interface when changing the at least one display characteristic.

16. A computer-implemented method of implementing an application framework workflow in an application, the method comprising:
providing an application user interface having an interface display area with a focal point, and a plurality of interface elements;
obtaining a workflow definition defining states of execution for each of the plurality of interface element, wherein the workflow definition includes:
defining a pre-active state having a first interface element display within the application display area, wherein the first interface element display is configured to display pre-active state display data;
defining an active state having a second interface element display within the application display area, wherein the second interface element display includes at least one input control that is configured to receive an input data, wherein the interface element is configured to transform to display the at least one input control during the active state, wherein the at least one input control is not visible during the pre-active state; and
defining a post-active state having a third interface element display within the application display area, wherein the third interface element display is configured to modify the pre-active state display data to display at least a portion of the input data received during the active state, wherein the input control is not visible during the post-active state;
receiving an input selecting one of the plurality of interface elements, wherein a previously selected interface element received a first input prior to selection of the selected interface element;
transitioning the selected interface element to the active state in accordance with the workflow definition;
displaying the first input received from the previously selected interface element within the application display area regardless of the selected interface element that is currently active within the application display area; and positioning the selected interface element based the position of the focal point within the interface display area.

17. The computer-implemented method of claim 16, further comprising transitioning selected interface element from the focal point to a non-focal point when the interface element transitions out of the active state.

18. The computer-implemented method of claim 16, wherein the selected element was in a pre-active state or a post-active state prior to being selected.

19. The computer-implemented of claim 16, further comprising:
   receiving a input data from a user; and
   executing a function during the active state based on the received input data.

20. A computer-implemented method for processing user input in an application framework, the method comprising:
   displaying a plurality of interface elements in a user interface having an application interface display, wherein each of the interface elements displays first display data;
   receiving an input to select one of the plurality of interface elements, wherein a previously selected interface element received a first input prior to selection of the selected interface element;
   positioning the selected interface element based, at least in part, on the position of a focal point within the application interface display,
   modifying a size and shape of the selected interface element to display at least one input control that is not visible until the interface element is selected;
   positioning the unselected interface elements based, at least in part, on the position of the selected interface element;
   displaying the first input received from the previously selected interface element within the application interface display regardless of the selected interface element that is currently active within the application interface display area;
   receiving a user input data at the at least one input control;
   executing a function based on the user input data;
   after the function has been executed,
   modifying the first display data of the selected interface element to display at least a portion of the user input data received by the at least one input control;
   modifying a size and shape of the selected interface element to hide the at least on user input control; and
   repositioning the plurality of interface elements.

21. The computer-implemented method of claim 20, wherein the selected element is in a pre-active state or a post-active state prior to being selected.

22. The computer-implemented method of claim 20, wherein the selected element is in a post-active state after executing the function.

23. The computer-implemented method of claim 20, wherein the function is logging a user into an account.

24. The computer-implemented method of claim 20, wherein the function is authorizing a payment transaction.

* * * * *

UNITED STATES PATENT AND TRADEMARK OFFICE
CERTIFICATE OF CORRECTION

PATENT NO. : 9,946,516 B2  
APPLICATION NO. : 14/214079  
DATED : April 17, 2018  
INVENTOR(S) : Jesse James Herlitz et al.

Page 1 of 1

It is certified that error appears in the above-identified patent and that said Letters Patent is hereby corrected as shown below:

In the Claims

In Column 15 at Line 22, In Claim 3, change "state of at least one" to --state--.

In Column 17 at Line 4, In Claim 16, change "based" to --based on--.

In Column 17 at Line 13 (approx.), In Claim 19, change "computer-implemented" to --computer implemented method--.

In Column 18 at Line 19 (approx.), In Claim 20, change "on" to --one--.

Signed and Sealed this  
Twenty-eighth Day of May, 2019

Andrei Iancu  
*Director of the United States Patent and Trademark Office*